United States Patent [19]

Sheptak

[11] 4,284,674
[45] Aug. 18, 1981

[54] THERMAL INSULATION

[75] Inventor: Nicholas Sheptak, Appleton, Wis.

[73] Assignee: American Can Company, Greenwich, Conn.

[21] Appl. No.: 92,624

[22] Filed: Nov. 8, 1979

[51] Int. Cl.³ .......................... B32B 1/04; B32B 3/02; B32B 27/34; B32B 27/32

[52] U.S. Cl. .................................... 428/69; 52/309.5; 52/309.8; 52/309.9; 52/406; 220/467; 428/213; 428/268; 428/423.1; 428/423.5; 428/334; 428/336; 428/441; 428/442; 428/475.5; 428/476.1; 428/476.9; 428/516; 428/518; 428/520; 428/522; 428/523; 428/910

[58] Field of Search ............... 428/69, 213, 216, 268, 428/325, 423.1, 423.5, 475.5, 476.1, 476.9, 516, 518, 520, 522, 523, 334, 336, 910, 911, 920, 421, 441, 442; 52/309.5, 309.8, 309.9, 406; 220/3, 467

[56] References Cited

U.S. PATENT DOCUMENTS

| Re. 28,554 | 9/1975 | Curler et al. .................. 428/910 X |
|---|---|---|
| 2,863,179 | 12/1958 | Gaugler .................. 52/406 |
| 2,939,811 | 6/1960 | Dillon .................. 428/69 |
| 3,004,877 | 10/1961 | Simms et al. .................. 428/69 |
| 3,075,857 | 1/1963 | Fior et al. .................. 428/476.3 |
| 3,264,165 | 8/1966 | Stickel .................. 428/69 |
| 3,514,367 | 5/1970 | James .................. 428/423.5 |
| 3,560,325 | 2/1971 | Sogi et al. .................. 428/516 X |
| 3,836,425 | 9/1974 | Whiting .................. 428/423.5 |
| 4,058,647 | 11/1977 | Inoue et al. .................. 428/476.1 |
| 4,087,587 | 5/1978 | Shida .................. 428/500 |
| 4,087,588 | 5/1978 | Shida .................. 428/500 |
| 4,172,915 | 10/1979 | Sheptak et al. .................. 428/69 |

*Primary Examiner*—Ellis P. Robinson
*Attorney, Agent, or Firm*—Robert P. Auber; Ernestine C. Bartlett; Ira S. Dorman

[57] ABSTRACT

Hermetically sealed articles are provided which enclose a porous mass of material of relatively low heat conductivity and a charge of a gas having a coefficient of thermal conductivity lower than that of air and thoroughly permeating the porous mass of material or such sealed pouches may enclose only the porous mass of material evacuated down to about 10 mm. Hg. The pouches are useful as thermal insulation materials and are constructed of confronting sheets of multi-ply laminate material sealed along free edge portions thereof and comprising (1) a multi-layer film including a core layer of ethylene vinyl alcohol copolymer adhered on each side to nylon, each nylon layer being adhered to a layer of chemically modified polyolefin; (2) optionally, a low density polyethylene layer; (3) a layer of primer material suitable to effect adhesion between said modified polyolefin layer or polyethylene layer and the outer layer of oriented polypropylene or other material suitable for conveying toughness, flex crack resistance and moisture barrier properties to such multi-ply laminar construction.

The articles are useful as thermal insulation materials.

18 Claims, 3 Drawing Figures

THERMAL INSULATION

BACKGROUND OF THE INVENTION

This invention relates to thermal insulation, and particularly to improvements in gas impervious pouch structure for containing a porous mass of thermal insulation or such a porous mass and a charge of gas having a coefficient of thermal conductivity lower than that of air.

Pouch structures containing insulation or insulation and gas as described have been found useful as insulation units for installation in the walls and doors of refrigerator cabinets. Such units both facilitate handling of the insulation and enhance performance of refrigerator cabinets and the like within which they are installed. These insulation units also have been found useful for other home appliances, such as, for example, freezers and water heaters, as well as for residential and commercial building structures.

Fibrous insulation comprising glass fibers or the like, in combination with an insulating gas such as difluorodichloromethane, commonly known as F-12 refrigerant, and enclosed in pouch structures of materials that are both gas and moisture impervious have been used.

The prior art is believed to be best exemplified by the following patents:

| Dybvig | 2,817,124 | 12/57 |
| Sorel | 2,966,439 | 12/60 |
| Simms et al | 3,004,877 | 10/61 |
| Gaugler | 2,863,179 | 12/58 |
| Gaugler et al | 2,779,066 | 01/57 |
| Stickel | 3,264,165 | 08/66 |
| Bolsolas | 4,054,711 | 10/77 |
| Dillon | 2,939,811 | 06/60 |
| Jacobs | 2,817,123 | 12/57 |
| Strong et al | 3,179,549 | 04/65 |
| Janos | 2,745,173 | 05/56 |

Dybvig, U.S. Pat. No. 2,817,124, discloses an insulating unit having two side by side compartments wherein the inner and outer walls of one compartment are comprised of Mylar coated on both sides with vapor deposited metal coating which in turn is coated with polyethylene, Saran or Hycar vinyl while the outer compartment is formed of polyethylene having pinholes of sufficient size to admit air.

Sorel, U.S. Pat. No. 2,966,439, discloses laminated products of normally thermoshrinkable polyvinylidene chloride film bonded in thermoshrunk condition to a normally dimensionally thermo-stable material such as fibrous sheet material.

Simms et al, U.S. Pat. No. 3,004,877, disclose heat insulating units for refrigeration cabinets comprising a porous mass and gas in a hermetically sealed bag formed of a multi-ply laminate including Kraft paper, Saran, Hycar vinyl cement and polyethylene.

Gaugler, U.S. Pat. Nos. 2,779,066 and 2,863,179, disclose heat insulating bags comprising double bags and double insulation and Freon gas comprising laminations of Mylar or vinyl chloride or vinyl acetate or Hycar vinyl; metal coating; Mylar or polystyrene; metal coating; Mylar or vinyl chloride or vinyl acetate or Hycar vinyl; Saran.

Stickel, U.S. Pat. No. 3,264,165, discloses insulating means comprising insulating material enclosed by Saran or a copolymer of vinyl chloride enclosed by Saran or a copolymer of vinyl chloride and vinyl acetate or Mylar adhered to a flexible closed-cell polyurethane film or multilayers of Kraft paper or foam; organic resin; metal coating; polyurethane foam; polyvinyl alcohol; metal coating; polyethylene.

Bolsolas, U.S. Pat. No. 4,054,711, discloses multilayer jacketing material for covering thermal insulation on pipes comprising a composite of metallized Mylar; adhesive; asbestos paper; glass scrim cloth; adhesive; polyvinyl fluoride film.

Jacobs, U.S. Pat. No. 2,817,123, discloses double bag constructions comprising an inner bag of laminated Mylar and Saran and an outer bag of fibrous insulation and polyethylene.

Dillon, U.S. Pat. No. 2,939,811, relates to heat-insulating units comprising hermetically sealed bags comprising deformable walls, a porous mass and gas wherein the bag comprises Saran, polyvinyl chloride, vinyl-nitrile rubber or polyethylene.

Strong et al, U.S. Pat. No. 3,179,549, disclose thermal insulating structures of the vacuum type comprising hermetically sealed containers having internal pressures of less than 100 microns mercury wherein the walls are low carbon steel and stainless steel.

Janos, U.S. Pat. No. 2,745,173, discloses vacuum insulation wherein the filler material is compressed before assembly and caused to retain its compressed form and wherein the walls of the structures are stainless steel or low carbon steel.

Prior art structures as represented by the above disclosures have been deficient in one or more aspects. Most of such constructions utilize Saran to meet moisture barrier problems and are thus accompanied by the problems generated by the shrinkability and tendency of Saran to become plastic at higher temperatures. Structures substituting or combining Mylar or other plastics have been subject to puncture by the fibrous insulating material. To overcome such problems, plastic film has been protected with metal coatings or polyurethane foam or relatively thick multi-ply laminations have been necessary or the multi-bag compartmented constructions have been proposed.

In U.S. Patent application Ser. No. 929,305 filed July 31, 1978 of Nicholas Sheptak and James E. Dewine, now U.S. Pat. No. 4,172,915 issued Oct. 30, 1979 improved unitary thermal insulating units are disclosed and claimed wherein the pouch is formed of a multi-ply laminate consisting essentially of an inwardly facing sealing layer of low density polyethylene; a layer of vinyl primer; a layer of metal foil; a layer of low density polyethylene; and an outwardly facing layer of Mylar or oriented polypropylene.

SUMMARY OF THE INVENTION

This invention is directed to an improvement over constructions as disclosed in said prior patents and said patent application Ser. No. 929,305, now U.S. Pat. No. 4,172,915. According to the invention, high barrier transparent structures are provided in which the barrier component is a multi-ply coextruded film barrier component comprising an ethylene vinyl alcohol core layer adhered on each side to a polyamide layer such as nylon which is in turn adhered to a layer of a chemically modified polyolefin.

A layer of low density polyethylene may, optionally, be adhered to the modified polyolefin layer or this polyethylene layer may be omitted. A layer of a material capable of conveying moisture barrier properties and capable of being adhered with a primer to the modified polyolefin layer or polyethylene layer, when present, is the outer layer of the construction. Preferably this outer layer will be oriented polypropylene.

Thermal insulating units are provided comprising a hermetically sealed pouch containing a porous mass of thermal insulation material and a charge of a gas having a coefficient of thermal conductivity lower than that of air enclosed in said pouch and permeating said porous mass of insulative material, the walls of said pouch being substantially impervious to said gas enclosed therein and to atmospheric gases and vapors. Alternatively, units are provided comprising a porous mass of thermal insulation material enclosed in a hermetically sealed pouch evacuated to a pressure of less than 100 microns of mercury prior to sealing.

DESCRIPTION OF THE PREFERRED EMBODIMENTS

Figure 1:
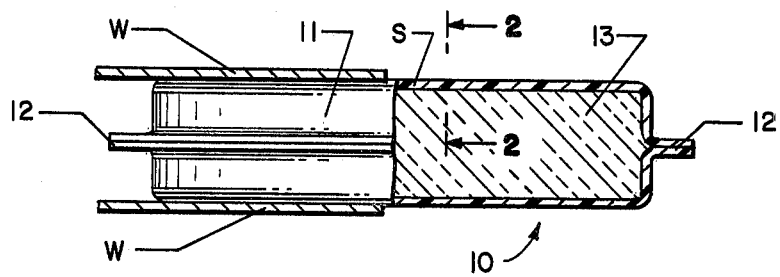
FIG. 1 is a perspective showing, with parts broken away and sectioned, of an insulating unit embodying the invention.

With reference to the drawing, there is seen in FIG. 1 spaced confronting walls W of a structure such as a refrigerator door panel, for example, between which there is disposed a pouch 10 made from a laminate sheet material embodying the invention, which pouch 10 includes a main portion 11 and a sealed peripheral portion 12. Pouch 10 conveniently is formed by sealing confronting surfaces of the free edge portions of a pair of rectangular sheets S of the material through application of heat and pressure in accordance with conventional practice. There is disposed within sealed pouch 10 a porous mass of material 13 of low-thermal conductivity, such as, for example, a fibrous mass of glass fibers. One such material is available under the trademark "FIBERGLAS", and preferably is formed as a batt of substantial thickness and resiliency. In one embodiment of the invention, a charge of a gas (not shown) having a coefficient of thermal conductivity lower than that of air is employed. The gas is preferably difluorodichloromethane, known in the trade as "F-12" and "R-12", which gas permeates the porous mass of glass fibers comprising batt 13.

In another embodiment of the invention, the permeating gas is omitted and the pouch 10 is evacuated down to 10 microns of mercury and hermetically sealed and employed without effect on insulating value.

Figure 2:
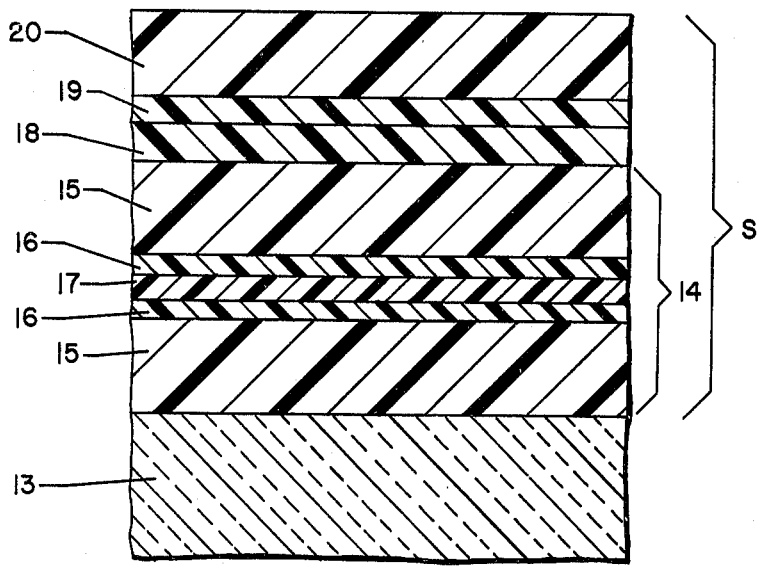
FIG. 2 is an enlarged showing taken in the plane of line 2—2 in FIG. 1, as seen looking in the direction of arrows applied thereto and illustrating a multi-ply, laminated structure of a pouch of the invention.
Figure 3:
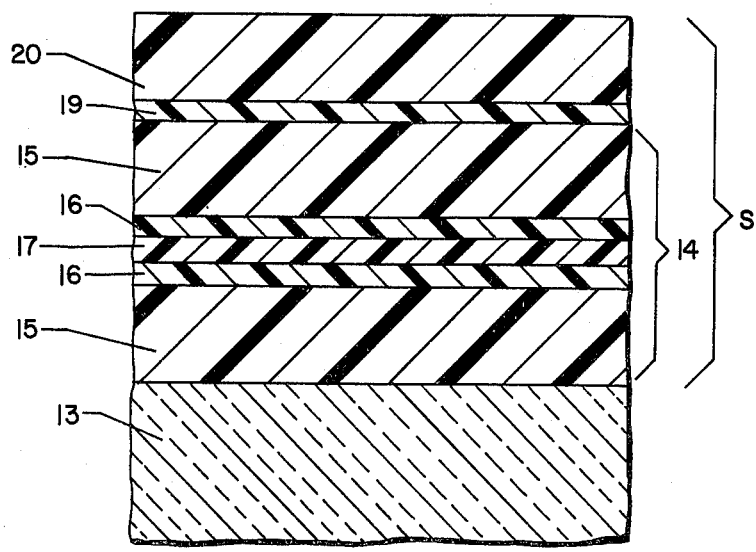
FIG. 3 is an enlarged showing similar to FIG. 2 and showing an alternative embodiment and modification of the pouch of FIG. 2.

With reference to FIGS. 2 and 3, the sheets S that define walls of the pouch are substantially impervious to the gas enclosed therein and to atmospheric gases and vapors and are unaffected by temperature changes over a wide range of variations. Such sheets provide high barrier, transparent structures that are fracture and/or puncture resistant and that retain such high barrier characteristics during and after processing into the finished package and upon subsequent handling. Such packages are designed for use as insulating panels in structures such as refrigerators which normally have a useful life in the nature of 10 to 20 years. It will therefore be apparent that the permeability characteristics of such sealed insulation articles must be such that are capable of being maintained over a substantial period of time without loss of permeating gas or without loss of vacuum and without admission of moisture, oxygen, etc.

The above characteristics are realized in the articles provided herein through the use of laminated sheet materials uniquely possessing toughness, flex crack resistance, sealability and high moisture and oxygen barrier properties.

The sheets S are comprised of multi-ply laminae consisting essentially of:

(1) a multi-layer coextruded cast film 14 varying in thickness from about 1.5 to 5.0 mils and preferably about 3 mils and comprising (a) a core layer 17 of ethylene vinyl alcohol copolymer film comprising from about 4% to 30% and preferably about 10% of the multi-layer film, adhered on each side to (b) a polyamide film layer 16, comprising from about 2 to 15% and preferably about 5% of the multi-layer film, each polyamide layer 16 being in turn adhered to (c) a layer 15 of chemically modified polyolefin film, comprising about 30% to 46% and preferably about 40% of the multi-layer film;

(2) optionally, a layer 18 of low density polyethylene film of about 0.5 to 2.0 mils and preferably about 1.0 mils adhered to the outer layer of the multi-layer film 14;

(3) a layer 19 of a suitable primer material of about 0.01 to 0.10 mils and preferably about 0.05 mils in thickness adhered to said polyethylene layer; and (4) an outer layer 20 of a polymeric material possessing moisture barrier properties and capable of being adhered to said polyethylene layer with a suitable primer, said outer layer being about 0.4 to 1.25 mils and preferably about 1.25 mils in thickness.

In an alternative embodiment of the invention as illustrated in FIG. 3, the polyethylene layer 18 is omitted and the sheet is otherwise identical to that illustrated in FIG. 2.

The components of the sheets S each function to perform specific and critical functions in the pouches 10 formed therefrom. For example, the oriented polypropylene layer 20 which forms the outer surface of the pouch walls conveys toughness, flex crack resistance and moisture barrier properties to the sheets. The multi-layer film 14 comprising 5 layers of components, provides a core 17 of EVOH which provides gas barrier properties, a layer 15 of chemically modified polyolefin which provides heat sealability and a polyamide layer 16 which enhances adhesion between the core of EVOH, 17, and the chemically modified polyolefin layer, 16.

The multi-layer film 14 is quite thin and can be made by coextrusion as described in U.S. application Ser. No. 973,948 filed Dec. 28, 1978 and commonly assigned herewith. The film may be produced by melting resins of modified polyolefin, polyamide and ethylene vinyl alcohol and coextruding the same as a cast film. Heat sealing of the outer layers of modified polyolefin is readily obtained.

Ethylene vinyl alcohol polymers suitable for extrusion are commercially available. Kuraray of Japan produces an ethylene vinyl alcohol copolymer under the designation "EP-F" which has 32 to 36% ethylene, a molecular weight of 29,500 and melting point of 356° F.

Other manufacturers produce suitable ethylene vinyl alcohol copolymers. One suitable copolymer has about 29% ethylene, a molecular weight of 22,000, and a melting point of 365° F. Another has about 40% ethylene, a molecular weight of 26,000, and a melting point of 327° F.

The polyamides which form the layers 16 may be any of commercially available materials well known as nylon. These polymers include polycaproamide, polyhexamethylene adipamide, poly-11-undecanoamide, poly-12-dodecanoamide, etc. and similar materials available commercially as nylon 6; nylon 6,6; nylon 6,10; nylon 6,15; etc.

The modified polyolefins which form the layers 15 adjacent the polyamide layers are blends of polyolefin and high density polyethylene (HDPE) grafted with an unsaturated fused ring carboxylic acid anhydride. The polyolefin component of the blend may include a number of resins such as high, low and medium density polyethylene and polyolefin copolymers such as ethylene vinyl acetate copolymer and ethylene acrylic acid. Modified polyolefin blends are disclosed in U.S. Pat. Nos. 4,087,587 and 4,087,588. Suitable modified polyolefins blends are available from the Chemplex Company of Rolling Meadows, Ill. under the name "PLEXAR". Commercially available grades of such modified polyolefins are blends of the graft with different polyolefins. These include Plexar-I, a blend with ethylene vinyl acetate copolymer; Plexar-II, a blend with high density polyethylene; Plexar-II further modified with an elastomer such as polyisobutylene; and Plexar-III, a blend with ethylene vinyl acetate polymer adapted for cast film coextrusion. Plexar III is the preferred component for the multi-layer film member 16 which is preferably formed by cast film coextrusion although it may also be formed by blown tube coextrusion or the like.

Sheets S herein are formed by priming the outer layer, for example, oriented polypropylene sheet 20 with a suitable primer material 19 and extrusion laminating the primed sheet material to either side of the multi-layer film 14 or by interposing low density polyethylene between the primed outer layer sheet material and the chemically modified polyolefin layer 15.

The sheet material comprising the outer layer of the construction may be any plastic material that is capable of conveying toughness and moisture barrier properties to the multi-layer construction S. Examples of such materials include oriented polypropylene, Saran (vinyl chloride-vinylidene chloride copolymer) coated oriented polypropylene, Saran coated oriented nylon, high density polyethylene and monochlorotrifluoroethylene, available commercially as "ACLAR" from Allied Chemical Co., of which oriented polypropylene is preferred.

Suitable primers include polyester/polyurethanes available commercially as Adcote 503C from Morton Chemical Co.; polyethylene imine available commercially as CHEMICAT P-145 from ALCOLAC; polyether/polyurethanes available commercially as "UNOFLEX" from Polymer Industries, Inc.; and the like.

Pouches 10 are formed from sheets S by any means conventional and well known in the art.

The barrier properties realized in the above described articles have been found to be held intact during processing of the laminate into the finished package and tests with freon filled packages as well as with high vacuum packages have demonstrated the utility of such structures for use as insulation packages.

While glass fiber insulation is preferred as the porous mass of thermally insulative material, it will be understood that mineral fiber as well as foamed type insulations are contemplated by the invention.

While various embodiments of the invention have been described, it will be understood that other modifications may be made without departing from the scope of the appended claims.

I claim:
1. A multi-ply laminate comprising:
   (1) a multi-layer coextruded film consisting essentially of (a) a core layer of ethylene vinyl alcohol adhered on each side to (b) a polyamide layer, each such polyamide layer being adhered to (c) a layer of a modified polyolefin which consists of a polyolefin polymer or copolymer blended with polyethylene grafted with an unsaturated fused ring carboxylic acid anhydride;
   (2) a layer of primer material effective to enhance adhesion between said modified polyolefin layer; and
   (3) an adjacent outer layer of a plastic material capable of conveying toughness and moisture barrier properties to said laminate.
2. A multi-ply laminate of claim 1 wherein said plastic material forming said outer layer is oriented polypropylene, oriented polypropylene coated with vinyl chloride-vinylidene chloride copolymers, oriented nylon coated with vinyl chloride-vinylidene chloride copolymer, high density polyethylene and monochlorotrifluoroethylene.
3. A multi-ply laminate of claim 1 wherein said plastic material forming the outer layer is oriented polypropylene.
4. A multi-ply laminate of claim 1 additionally comprising a layer of low density polyethylene between said primer and modified polyolefin layer.
5. A multi-ply laminate of claim 1 wherein said modified polyolefin layer consists of ethylene vinyl acetate blended with polyethylene grafted with said acid anhydride.
6. A multi-ply laminate of claim 4 wherein said polyamide layer is nylon.
7. A multi-ply laminate comprising:
   (1) a five-layer coextruded cast film of about 1.5 to 5 mils in thickness consisting essentially of a core layer of ethylene-vinyl alcohol comprising about 10% of the film thickness adhered on each side to nylon comprising about 5% of the film thickness, each nylon layer being adhered to a layer of modified polyolefin comprising ethylene vinyl acetate blended with high density polyethylene grafted with an unsaturated fused ring carboxylic acid anhydride, each of said modified polyolefin layers comprising about 40% of the film thickness;
   (2) a layer of about 0.5 to 2.0 mils of low density polyethylene adhered to one side of one of said modified polyolefin layers;
   (3) a layer of about 0.01 to 0.10 mils of a polyester-polyurethane primer adhered to said polyethylene layer; and
   (4) an outwardly facing layer of oriented polypropylene adhered to said primer layer.
8. A multi-ply laminate comprising:
   (1) a five-layer coextruded cast film of about 1.5 to 5.0 mils in thickness consisting essentially of a core layer of ethylene-vinyl alcohol comprising about 10% of the film thickness adhered on each side to nylon comprising about 5% of the film thickness, each nylon layer being adhered to a layer of modified polyolefin comprising ethylene vinyl acetate blended high density polyethylene grafted with an unsaturated fused ring carboxylic acid anhydride, each of said modified polyolefin layers comprising about 40% of the film thickness;

(2) a layer of about 0.01 to 0.10 mils of a polyester-polyurethane primer adhered to said modified polyolefin layer; and (3) an outwardly facing layer of oriented polypropylene adhered to said primer layer.

9. In a thermal insulating unit comprising a porous mass of thermally insulative material and a sealed pouch hermetically enclosing said porous mass; the improvement which comprises providing a heat sealed, puncture resistant insulating unit having vapor and gas barrier properties wherein the pouch is formed of a multi-ply laminate of claim 1.

10. The improvement as claimed in claim 9 wherein said insulating unit also seals a charge of gas having a coefficient of thermal conductivity lower than that of air which permeates the porous mass of insulative material.

11. The improvement as claimed in claim 10, wherein said permeating gas is difluorodichloromethane.

12. The improvement as claimed in claim 9 wherein said pouch containing said insulative material is evacuated to a pressure less than 100 microns of mercury prior to formation of the hermetic seal.

13. In a thermal insulative unit comprising a porous mass of thermally insulative material; a charge of gas having a coefficient of thermal conductivity lower than that of air and permeating said porous mass of insulative material, and a sealed pouch hermetically enclosing said porous mass; the improvement which comprises providing said insulative material and said gas in a heat sealed, puncture resistant, vapor and gas barrier insulating unit wherein the pouch is formed of a multi-ply laminate as claimed in claim 7.

14. The improvement as claimed in claim 13 wherein the insulative material comprises glass fiber.

15. The improvement as claimed in claim 13 wherein the gas is difluorodichloromethane.

16. In a thermal insulative unit comprising a porous mass of thermally insulative material and a sealed pouch hermetically enclosing said porous mass of insulative material; the improvement which comprises providing said insulative material in a heat sealed, puncture resistant, vapor and gas barrier insulating unit wherein the pouch is formed of a multi-ply laminate as claimed in claim 8.

17. The improvement as claimed in claim 16 wherein the insulative material comprises glass fibers.

18. The improvement as claimed in claim 16 wherein said pouch containing said insulative material is evacuated to a pressure of less than 100 microns of mercury prior to formation of the hermetic seal.

* * * * *